(12) United States Patent
Gan et al.

(10) Patent No.: US 7,789,355 B2
(45) Date of Patent: Sep. 7, 2010

(54) SUPPORT STAND FOR FLAT DISPLAY MONITOR AND ELEVATOR USED FOR SUPPORT STAND

(75) Inventors: Wen-Lin Gan, Shenzhen (CN); Er-Zhou Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 116 days.

(21) Appl. No.: 12/164,126

(22) Filed: Jun. 30, 2008

(65) Prior Publication Data

US 2009/0184224 A1 Jul. 23, 2009

(30) Foreign Application Priority Data

Jan. 22, 2008 (CN) ........................ 2008 1 0300184

(51) Int. Cl.
*F16M 11/00* (2006.01)
(52) U.S. Cl. ................... 248/157; 248/917; 361/679.22
(58) Field of Classification Search ................. 248/157, 248/584, 354.3, 354.4, 354.7, 917, 919; 361/679.61, 361/679.22
See application file for complete search history.

(56) References Cited

U.S. PATENT DOCUMENTS 6,712,321 B1 * 3/2004 Su et al. ................ 248/123.11
6,997,422 B2 * 2/2006 Sweere et al. .......... 248/123.11
7,036,787 B1 * 5/2006 Lin ............................ 248/676
7,124,984 B2 * 10/2006 Yokouchi et al. .......... 248/125.8
7,168,665 B2 * 1/2007 Hong et al. ............... 248/125.1
7,424,991 B2 * 9/2008 Kim et al. ................ 248/125.9
7,458,546 B2 * 12/2008 Jang .......................... 248/161
7,573,711 B2 * 8/2009 Kim et al. .............. 361/679.22
7,611,103 B2 * 11/2009 Ha et al. ................... 248/125.2
7,628,371 B2 * 12/2009 Gan et al. ................... 248/422
2008/0099637 A1 * 5/2008 Pai .............................. 248/157

* cited by examiner

*Primary Examiner*—Anita M King
(74) *Attorney, Agent, or Firm*—Zhigang Ma (57) ABSTRACT

An exemplary elevator (50) includes a support mechanism (51), an elevating mechanism (52), and an adjusting mechanism (53). The support mechanism includes a support bracket (511) and a coil spring (514). The elevating mechanism includes a rotatable member (521) rotatable attached to the support bracket, a driven member (524) fixed to the rotatable member, a sliding bracket (526) slidably connected to the support bracket, and a sliding member (527) fixed to the sliding bracket. The sliding member is capable of engaging with the rotatable member for converting rotation to linear motion. The adjusting mechanism includes a diver capable of engaging with the driven member and driving the driven member to rotate. A bottom end of the support bracket is fixed to the adjusting mechanism. An end of the coil spring is fixed on the sliding bracket, and another end of the coil spring is connected to the support bracket.

20 Claims, 8 Drawing Sheets

SUPPORT STAND FOR FLAT DISPLAY MONITOR AND ELEVATOR USED FOR SUPPORT STAND

BACKGROUND

1. Field of the Invention

The present invention generally relates to support stands, particularly, to a support stand typically for a flat display monitor. The present invention further provides an elevator for adjusting an altitude of the support stand.

2. Discussion of the Related Art

With the widespread use of computers, display devices of the computers come in a variety of sizes, shapes, and weights. Especially, flat-panel display monitors such as liquid crystal display (LCD) monitors, are widely used due to their thin bodies.

Figure 8:
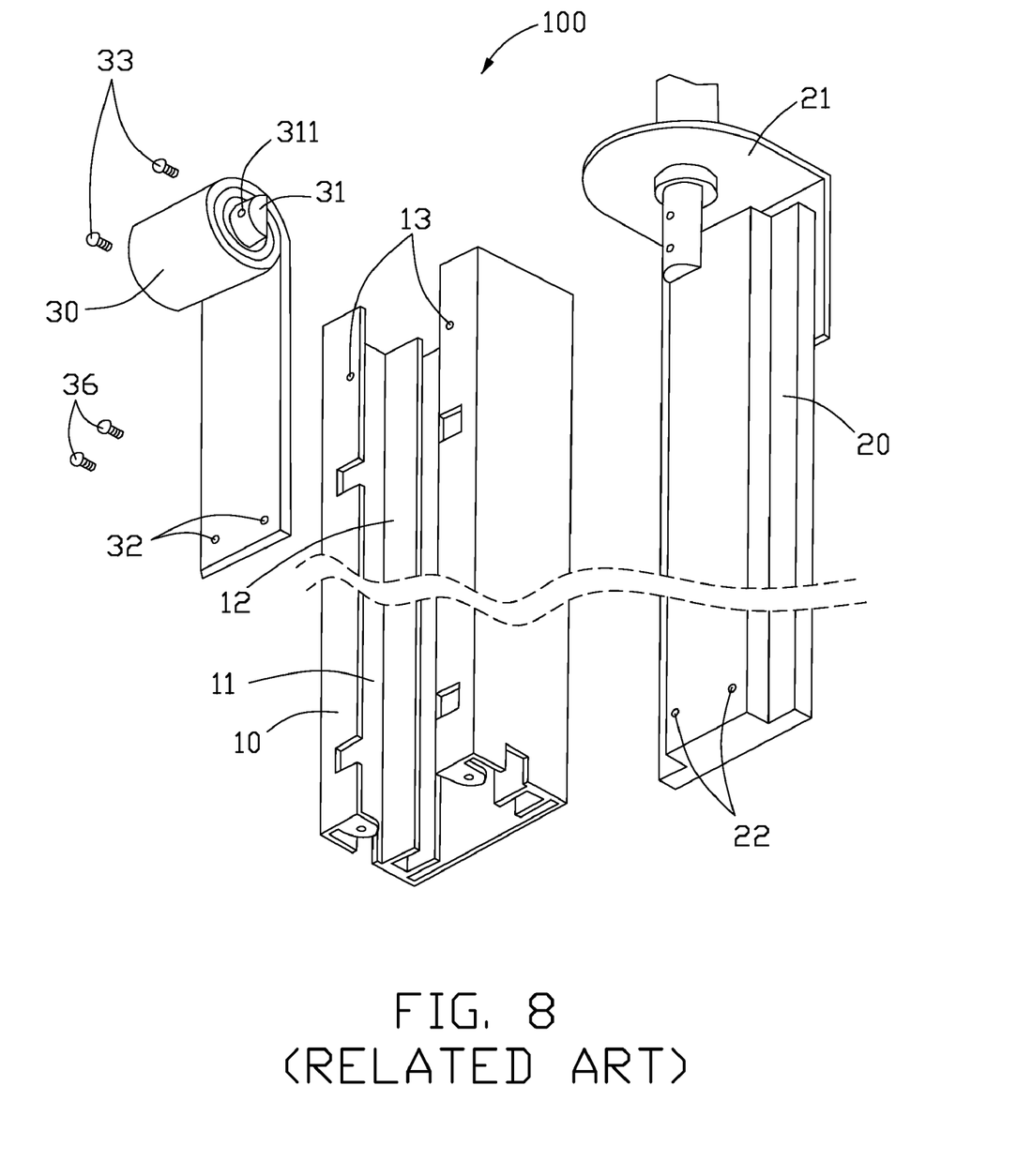
FIG. 8 is an exploded, isometric view of a conventional elevator.

Typically, a function of adjusting an altitude of the flat display monitor can be realized via a support stand having an elevator. Referring to FIG. 8, a conventional elevator 100 for a support stand includes a support member 10, an elevating member 20, and a coil spring 30.

The support member 10 includes an elongated main portion (not labeled), and two side portions (not labeled) extending from opposite sides of the elongated main portion. The main portion and the side portions cooperatively define a receiving groove 11 for mounting the elevating member 20. Two guide rails 12 are formed on opposite inner surfaces of the side portions correspondingly. The support member 10 further defines two fixing holes 13 adjacent to top ends of the side portions.

The elevating member 20 includes a middle portion (not labeled), two sliding portions (not labeled) extending from opposite sides of the middle portion, and a connecting portion 21 connected to an end of the middle portion. The middle portion defines two threaded holes 22 in another end of the middle portion opposite to the connecting portion 21. The two sliding portion are configured to engage in the guide rails 12 of the support member 10 correspondingly, thus the elevating member 20 is slidable in the receiving groove 11 relative to the support member 10.

The coil spring 30 includes a first end coiled to a shaft 31 and a second end opposite to the first end defining two through holes 32. The shaft 31 defines two fixing holes 311 in opposite ends of the shaft 31 correspondingly. The shaft 31 is fixed to the support member 10 by using screws 33 to pass through the fixing holes 311 and screwed in the two fixing holes 13 of the support member 10 correspondingly. The second end of the coil spring 30 is fixed to the elevating member 20 by using screws 36 to pass through the through holes 32 and screwed in the threaded holes 22 of the elevating member 20.

In use, the connecting portion 21 of the elevating member 20 supports a flat display monitor. To lower an altitude of the flat display monitor, an external force is applied on the flat display monitor for pressing the elevating member 20 to slide downwards relative to the support member 10. When the elevating member 20 slides a predetermined position, the external force is released. The elevating member 20 with the flat display monitor remains in the predetermined position by an elastic force of the coil spring 30 and a friction force created between the elevating member 20 and the support member 10. To raise the altitude of the flat display monitor, another external force is applied on the flat display monitor for lifting the elevating member 20 to slide upwards relative to the support member 10 to another predetermined position.

However, it is inconvenient to adjust an altitude of the flat display monitor when a user needs to operate the elevator 100 by two hands. In addition, during use, a user may need to exert great effort on the flat display monitor in order to be able to pushing the elevating member 20 to slide relative to the support member 10. Furthermore, the altitude of the flat display monitor cannot be quickly adjusted by the elevator 100.

Therefore, a new support stand for a flat display monitor is desired in order to overcome the above-described shortcomings. An elevator used for adjusting an altitude of the support stand is also desired.

SUMMARY

In one aspect, a support stand for a flat display monitor includes a monitor bracket capable of connecting to the flat display monitor, a base member, and an elevator mounted to the base member and adjustably connected to the monitor bracket. The elevator includes a support mechanism, an elevating mechanism, and an adjusting mechanism. The support mechanism includes a support bracket and a coil spring. The elevating mechanism includes a rotatable member rotatably attached to the support bracket, a driven member fixed to the rotatable member, a sliding bracket fixed to the monitor bracket and slidably connected to the support bracket, and a sliding member fixed to the sliding bracket. The sliding member is capable of engaging with the rotatable member for converting rotation to linear motion. The adjusting mechanism is fixed on the base member and includes a diver capable of engaging with the driven member and driving the driven member to rotate. A bottom end of the support bracket is fixed to the adjusting mechanism. An end of the coil spring is fixed on the sliding bracket, and another end of the coil spring is connected to the support bracket.

In another aspect, an elevator, used for a support stand of a flat display monitor, includes a support mechanism, an elevating mechanism, and an adjusting mechanism. The support mechanism includes a support bracket and a coil spring. The elevating mechanism includes a rotatable member rotatably attached to the support bracket, a driven member fixed to the rotatable member, a sliding bracket slidably connected to the support bracket, and a sliding member fixed to the sliding bracket. The sliding member is capable of engaging with the rotatable member for converting rotation to linear motion. The adjusting mechanism includes a diver capable of engaging with the driven member and driving the driven member to rotate. A bottom end of the support bracket is fixed to the adjusting mechanism. An end of the coil spring is fixed on the sliding bracket, and another end of the coil spring is connected to the support bracket.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support stand for a flat display monitor. Moreover, in the drawings, like reference numerals designate corresponding parts throughout the several views.

DETAILED DESCRIPTION OF THE EMBODIMENTS

Reference will now be made to the drawings to describe preferred embodiments of the present support stand and the elevator in detail.

Figure 1:
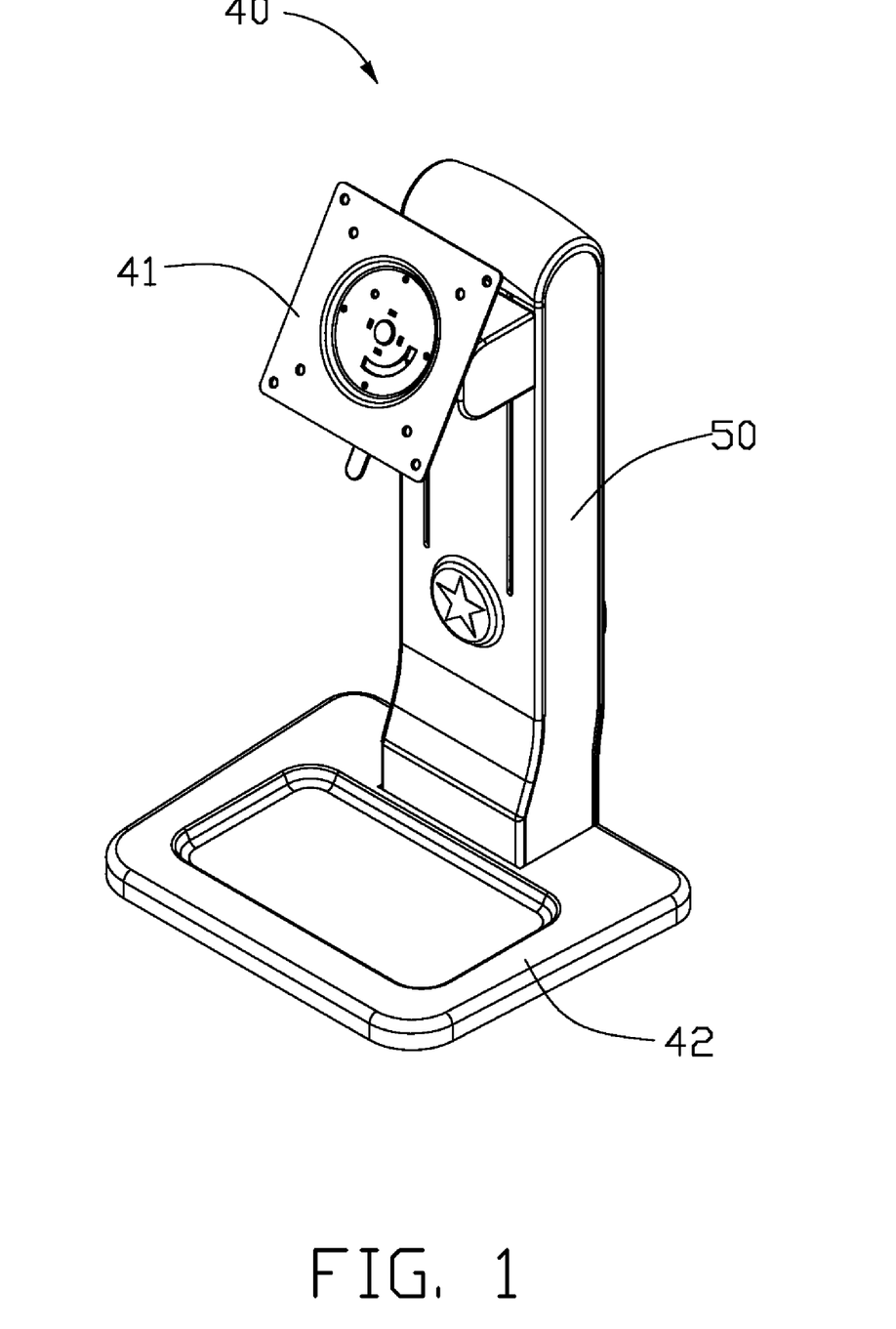
FIG. 1 is an assembled, isometric view of a support stand for a flat display monitor in accordance with an exemplary embodiment of the present invention.

Referring to the drawings in detail, FIG. 1 shows a support stand 40 for a flat display monitor (not shown) in accordance with an exemplary embodiment of the present invention. The support stand 40 includes a monitor bracket 41 capable of connecting to the flat display monitor, a base member 42, an elevator 50 mounted to the base member 42 and adjustably connected to the monitor bracket 41.

Figure 2:
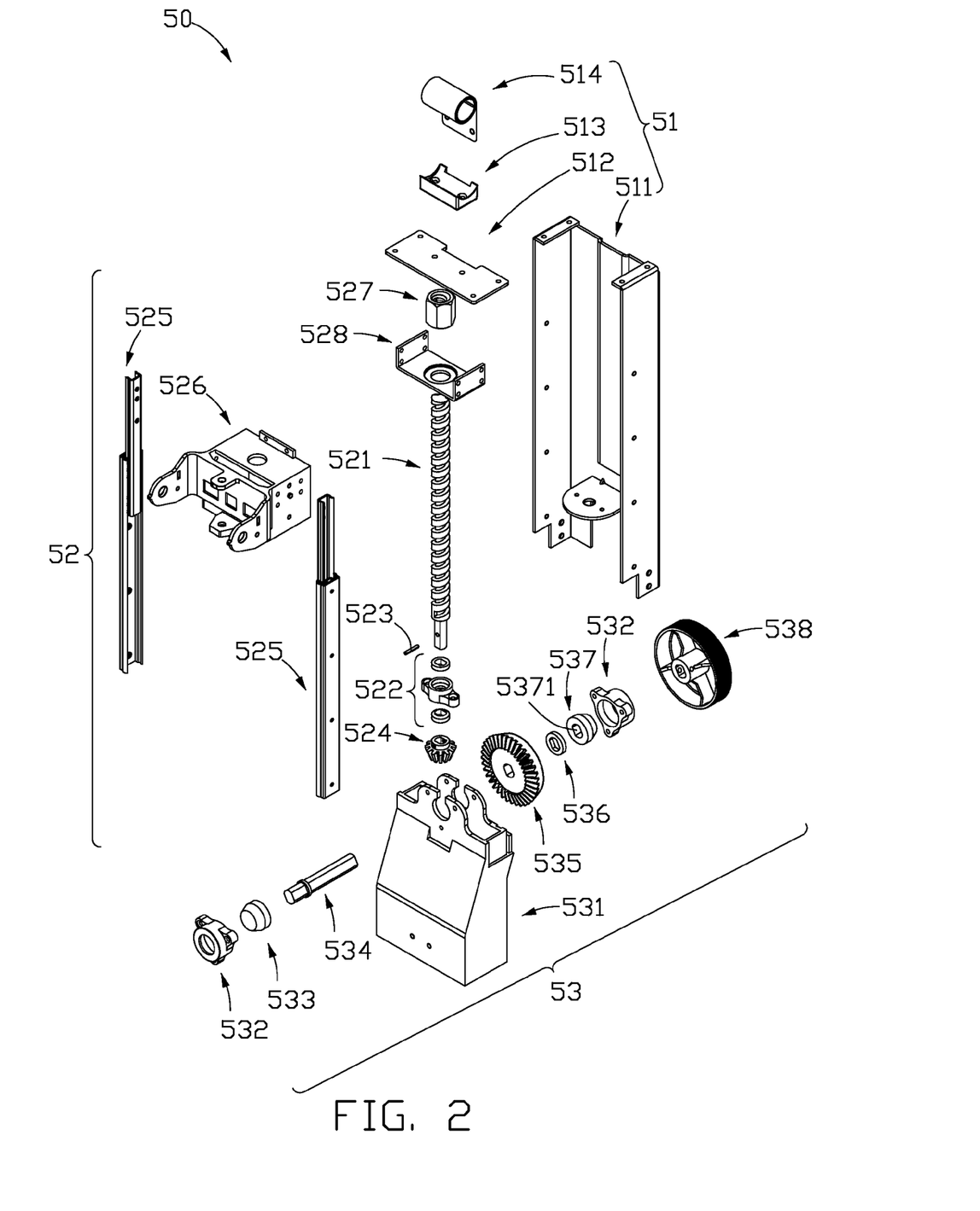
FIG. 2 is an exploded, isometric view of an elevator of the support stand of FIG. 1.
Figure 3:
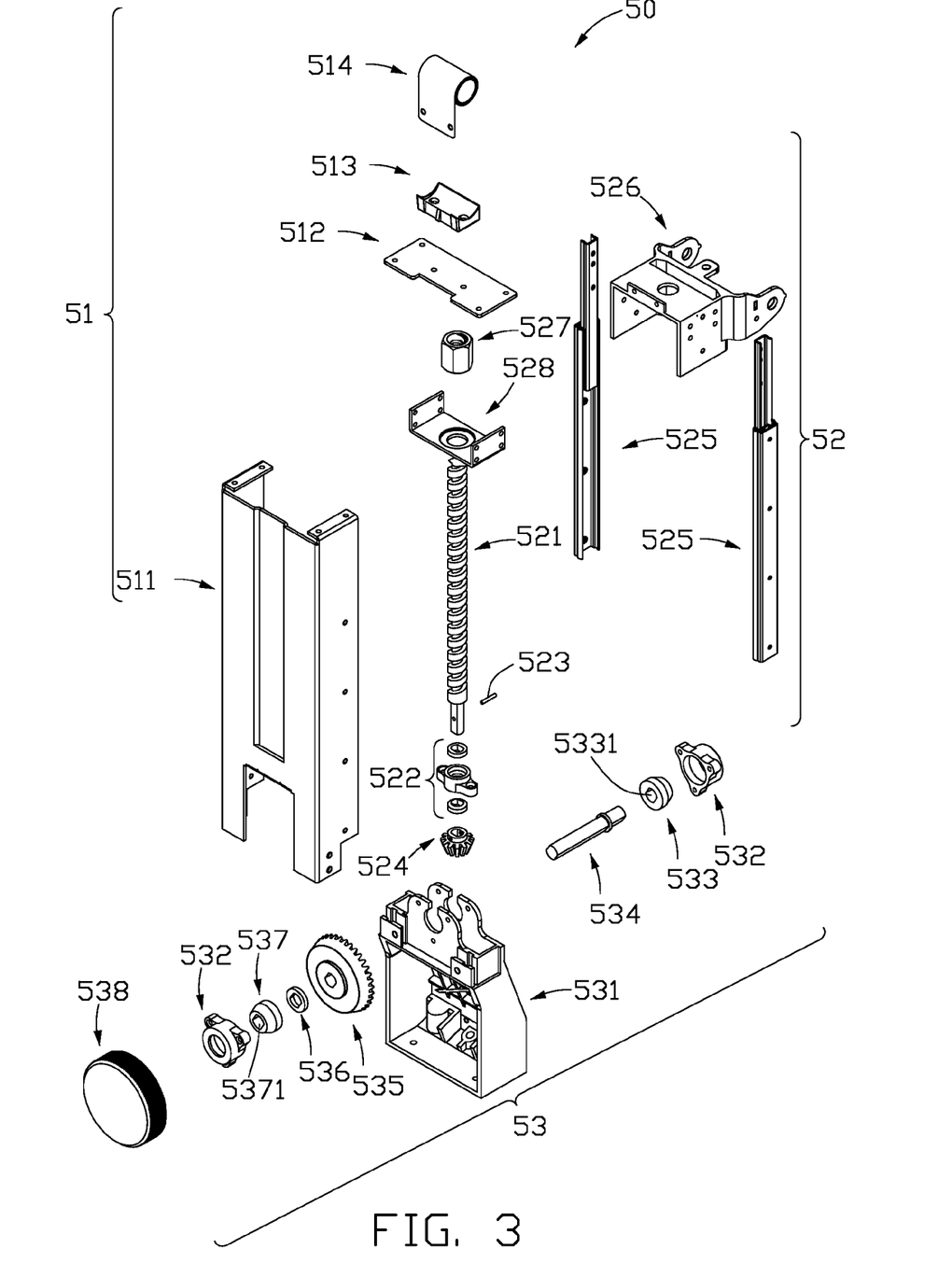
FIG. 3 is similar to FIG. 2, but showing a view from another aspect.

Referring to FIGS. 2 and 3, the elevator 50 includes a support mechanism 51, an elevating mechanism 52, and an actuating mechanism 53.

Figure 4:
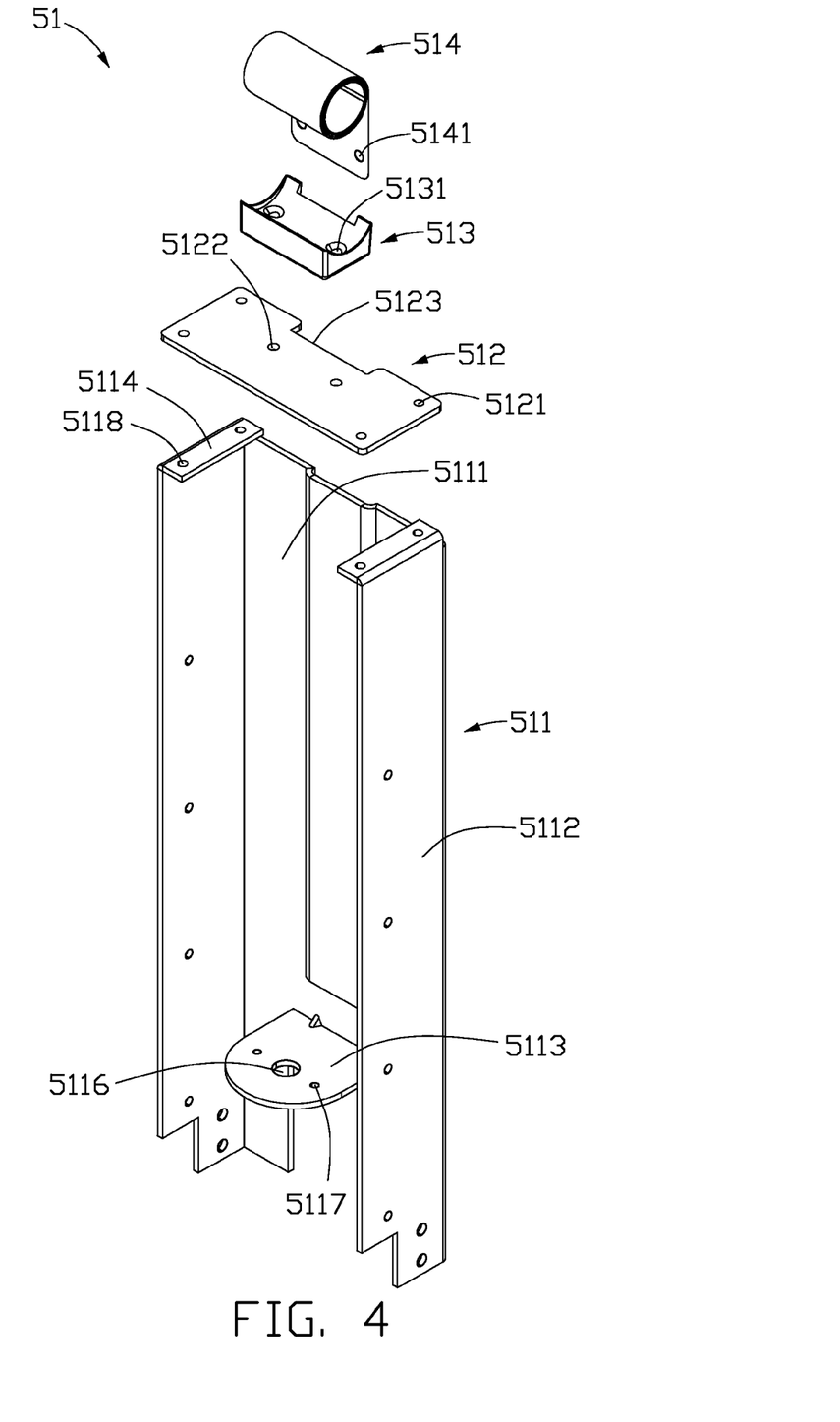
FIG. 4 is an enlarged, exploded, isometric view of a support mechanism of the elevator of FIG. 2.

Referring to FIG. 4, the support mechanism 51 includes a support bracket 511, a fixing sheet 512, a spring base 513, and a coil spring 514.

The support bracket 511 includes a main portion 5111, two side portions 5112, a support piece 5113, and two mounting pieces 5114. The side portions 5112 perpendicularly extend from opposite sides of the main portion 5111. Each of the side portions 5112 defines a plurality of through holes for connecting the support bracket 511 to the elevating mechanism 52. The support piece 5113 perpendicularly extends from an end of the main portion 5111. The support piece 5113 defines a through hole 5116 in a middle and two fixing holes 5117 adjacent to the through hole 5116. The mounting pieces 5114 extend inwards from ends of the side portions 5112 correspondingly away from the support piece 5113. Each of the mounting pieces 5114 defines two mounting holes 5118.

The fixing sheet 512 is substantially a rectangular sheet. The fixing sheet 512 defines four fixing holes 5121 in four corners of the fixing sheet 512 correspondingly, two positioning holes 5122 in a middle, and a notch 5123 in a side portion adjacent to the middle. The four fixing holes 5121 corresponds to the mounting holes 5118 of the mounting pieces 5114 of the support bracket 511.

The spring base 513 defines a curved groove (not labeled) for mounting the coil spring 514 and two mounting holes 5131 through a bottom surface of the curved groove. The mounting holes 5131 correspond to the positioning holes 5122 of the fixing sheet 512, correspondingly.

The coil spring 514 defines two fixing holes 5141 adjacent to an end of the coil spring 514. The coil spring 514 is configured for creating an elastic force for lifting the flat display monitor.

Figure 5:
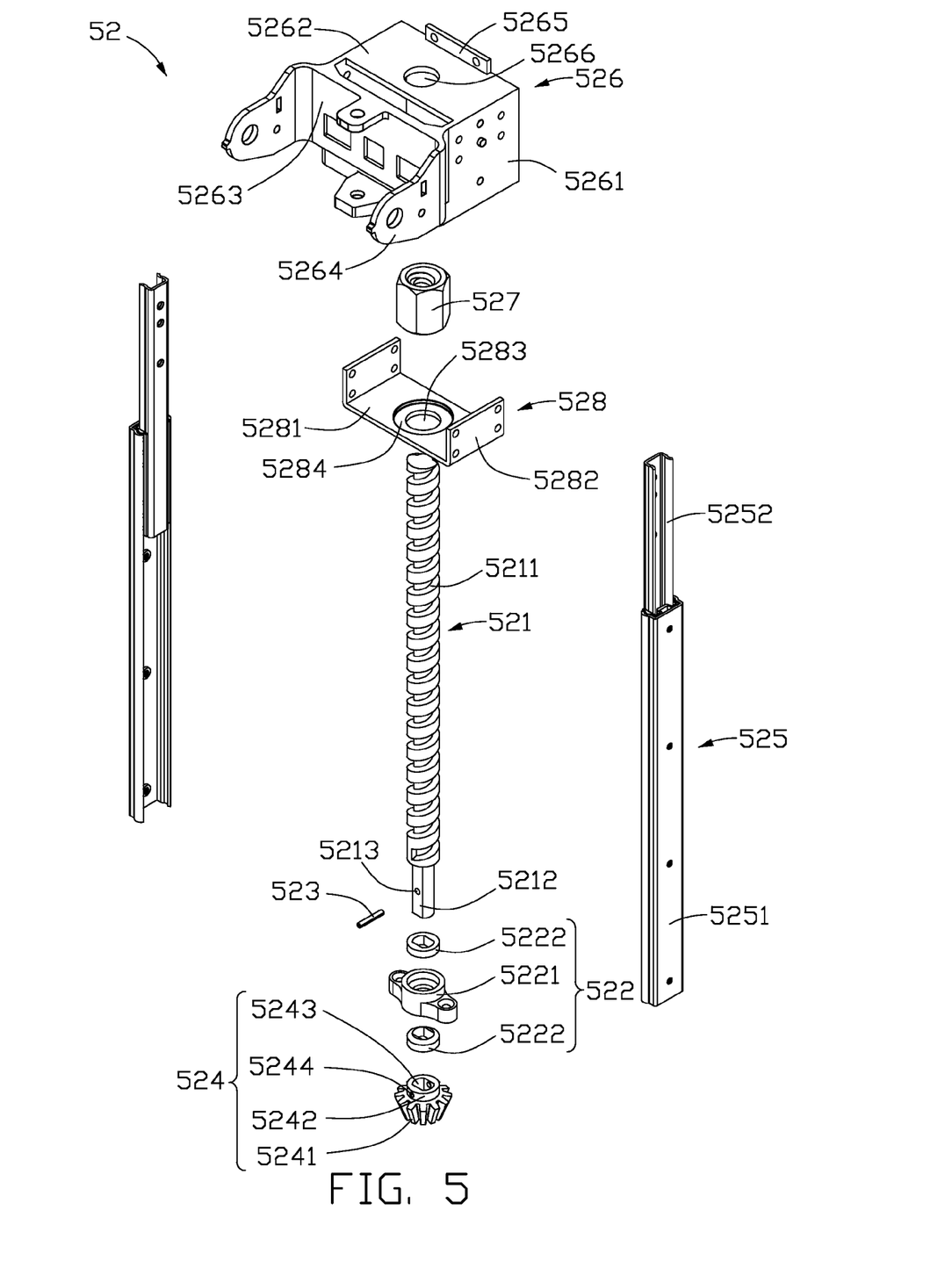
FIG. 5 is an enlarged, exploded, isometric view of an elevating mechanism of the elevator of FIG. 2.

Referring to FIG. 5, the elevating mechanism 52 includes a rotatable member 521, a positioning module 522, a fixing pin 523, a driven member 524, a pair of guide rails 525, a sliding bracket 526, a sliding member 527, and a fixing bracket 528.

The sliding bracket 526, the sliding member 527, and the fixing bracket 528 cooperatively form a sliding module (not labeled).

The rotatable member 521 is a screw shaft including a threaded portion 5211 and a shaft portion 5212 located at an end of the threaded portion 5211. The threaded portion 5211 is larger in diameter than the shaft portion 5212. The shaft portion 5212 is flattened, and has a cross-section having a double D-shape. The rotatable member 521 defines a pinhole 5213. Alternatively, the cross-section of the shaft portion 5212 of the rotatable member 521 may be other non-circular shape. For example, the cross-section can be triangular, pentagonal, or hexagonal.

The positioning module 522 includes a fixing member 5221 and two rotatable rings 5222. The fixing member 5221 includes a sleeve barrel (not labeled), two fixing portions (not labeled) extending from opposite sides of the sleeve barrel, and an annular flange (not labeled) formed in the sleeve barrel. Each of the fixing portions defines a fixing hole (not labeled). The sleeve barrel and the flange cooperatively define two receiving grooves (not labeled). Each of the rotatable rings 5222 defines a non-circular hole corresponding to the cross-section of the shaft portion 5212 of the rotatable member 521. The rotatable rings 5222 are configured for engaging in the receiving grooves of the fixing member 5221 correspondingly and being rotated with the rotatable member 521.

The fixing pin 523 is configured for fixing the driven member 524 to the rotatable member 521.

The driven member 524 member is a bevel gear including a gear portion 5241 and a link portion 5242 extending from an end of the gear portion 5241. The link portion 5242 defines a non-circular engaging hole 5243 in a middle corresponding to the shaft portion 5212 of the rotatable member 521 and a pin hole 5244 through a sidewall of the link portion 5242 corresponding to the fixing pin 523.

Each of the guide rails 525 includes an exterior rail 5251 and an inner rail 5252. The inner rail 5252 is received in the exterior rail 5251 and is slidable relative to the exterior rail 5251. The exterior rail 5251 defines a plurality of threaded holes (not labeled) corresponding to the through holes of the side portion 5112 of the support bracket 511. The exterior rail 5251 is configured for being fixed to the side portion 5112 of the support bracket 511 by screws engaging in the threaded holes and the through holes of the side portion 5112 of the support bracket 511. The inner rail 5252 defines a plurality of fixing holes for engaging with screws, thereby fixing the inner rail 5252 to the sliding bracket 526 by screws.

The sliding bracket 526 includes two sidewalls 5261, an upper wall 5262, a rear wall 5263, two extending pieces 5264, and a fixing piece 5265. The sidewalls 5261 perpendicularly extend from opposite ends of the upper wall 5262. Each of the sidewalls 5261 defines a plurality of fixing holes (not labeled). The upper wall 5262 defines a through hole 5266 in a middle configured for allowing the rotatable member 521 to pass through. The rear wall 5263 extends from a side of the upper wall 5262 and connects to the sidewalls 5261. The two extending piece 5264 perpendicularly extend from opposite ends of the rear wall 5263 correspondingly and configured for connecting to the flat display monitor. The fixing piece 5265 perpendicularly extends from another side of the upper wall opposite to the rear wall 5263 and defines two fixing holes (not labeled) corresponding to the fixing holes 5141 of the coil spring 514.

The sliding member 527 is substantially a hexagonal nut for engaging with the rotatable member 520. The sliding member 527 defines a threaded hole in a middle.

The fixing bracket 528 includes a rectangular base sheet 5281 and two sidewalls 5282 perpendicularly extending from opposite ends of the base sheet 5281. Each of the sidewalls 5282 defines a plurality of fixing holes corresponding to the fixing holes of the sliding bracket 526. The base sheet 5281 defines a through hole 5283 in a middle for allowing the rotatable member 520 to pass through and an annular groove 5284 in a portion surrounding the through hole 5283. The annular groove 5284 is configured for partially receiving the sliding member 527.

Figure 6:
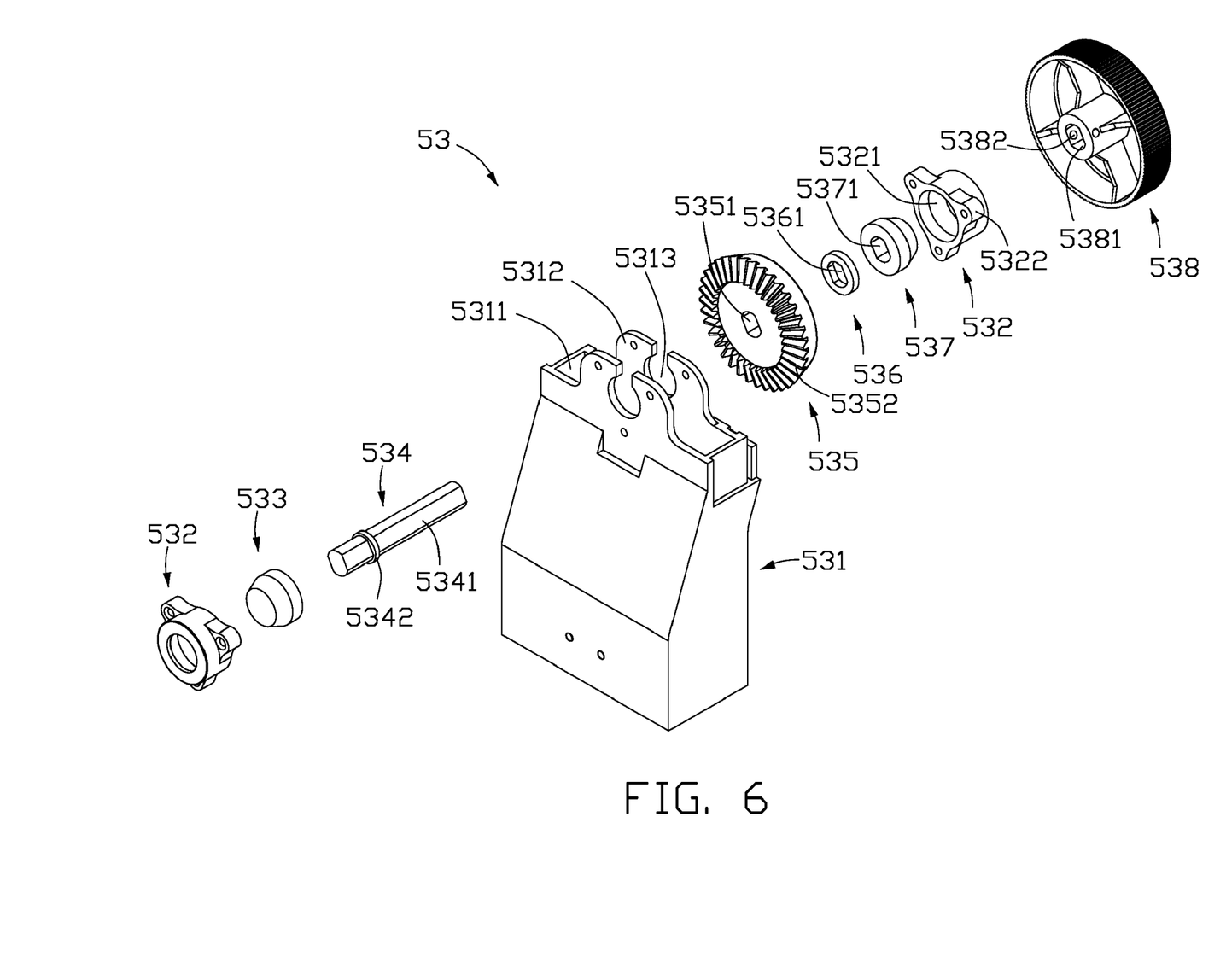
FIG. 6 is an enlarged, exploded, isometric view of an adjusting mechanism of the elevator of FIG. 2.

Referring to FIG. 6, the adjusting mechanism 53 includes a support bracket 531, two latching members 532, a first strengthening member 533, a pivot shaft 534, a driver 535, a washer 536, a second strengthening member 537, and an operation wheel 538.

The support bracket 531 defines a receiving groove 5311 for partially receiving the driver 535 and includes two fixing walls 5312. The fixing walls 5312 are positioned on opposite sides of the receiving groove 5311 correspondingly. Each of the fixing walls 5312 defines a pivot hole 5313 in a middle and a plurality of fixing holes (not labeled) adjacent to the pivot hole 5313. The pivot hole 5313 is substantially a C-shaped hole that is preferably a little larger than the washer 536. An amount of the fixing holes in each of the fixing walls is preferably three.

Each of the latching members 532 defines a mounting groove 5321 in a middle and includes a plurality of fixing protrusions 5322 extending from a sidewall of the latching member 532. Each of the fixing protrusions 5322 defines a mounting hole (not labeled) corresponding to each of the fixing holes of the support bracket 531. A number of the fixing protrusions 5322 is preferably three. The mounting grooves 5321 of the latching members 532 are configured for receiving the strengthening members 533 and 537 correspondingly.

The first strengthening member 533 defines a non-circular hole 5331 (see FIG. 3) for fixed engagement of an end of the pivot shaft 534 therein.

The pivot shaft 534 includes a shaft portion 5341 and a flange 5342 positioned adjacent to an end of the shaft portion 5341. A cross-section taken perpendicular to a central axis of the shaft portion 5341 is non-circular.

The driver 535 is a bevel gear including a gear portion 5352. The gear portion 5352 defines a through hole 5351 in a middle. The through hole 5351 is a non-circular hole for allowing the shaft portion 5341 of the pivot shaft 534 to pass through. The gear portion 5352 is configured for engaging with the gear portion 5241 of the driven member 524, thereby driving the driven member 524 to rotate.

The washer 536 defines a non-circular hole 5361 for engaging with the shaft portion 5341 of the pivot shaft 534, thus the washer 536 cannot rotate relative to the pivot shaft.

The second strengthening member 537 defines a non-circular hole 5371 for fixedly engaging with the shaft portion 5341 of the pivot shaft 534.

The operation wheel 538 defines a middle hole 5381 in a middle portion (not labeled) and a fixing hole 5382 communicating with the middle hole 5381. The middle hole 5381 is a non-circular hole 5382 for engaging with the shaft portion 5341 of the pivot shaft 534. The fixing hole 5382 is configured for engaging with a screw, thus fixing the operation wheel 538 to the pivot shaft 534.

Referring to FIGS. 2 through 7 again, to assemble the elevator 50, an end of the sliding member 527 is placed in the annular groove 5284 of the fixing bracket 528, another end of the sliding member 527 abuts the upper wall 5262 of the sliding bracket 526. The threaded hole of the sliding member 527 is aligned with the through hole 5266 of the sliding bracket 526. The fixing bracket 528 with the sliding member 527 is fixed to the sliding bracket 526 by using screws engaging in the fixing holes of the fixing bracket 528 and the fixing holes of the sliding bracket 526. The fixing bracket 528, the sliding member 527, and the sliding bracket 526 cooperatively form a sliding module. The inner rails 5252 of the guide rails 525 are fixed to the sidewalls 5261 of the sliding bracket 526 correspondingly. The threaded portion 5211 of the rotatable member 521 is passed through the through hole 5283 of the fixing bracket 528 and engaging with the sliding member 527. An end of the threaded portion 5211 of the rotatable member 521 can also be passed through the through hole 5266 of the sliding bracket 526. The shaft portion 5212 of the rotatable member 521 is passed through one of the rotatable rings 5222, the fixing member 5221, the other one of the rotatable rings 5222, and the through hole 5116 of the support piece 5113 of the support bracket 511 orderly. The fixing member 5221 is fixed to the support piece 5113 by using screws engaging in the fixing portions of the fixing member 5221 and the fixing holes 5117 of the support bracket 511 correspondingly. The exterior rails 5251 of the guide rails 525 are fixed to the side portions 5112 of the support bracket 511 correspondingly by using screws engaging in the threaded holes of the exterior rail 5251 and the through holes of the side portions 5112 of the support bracket 511. Thus, the elevating mechanism 52 is assembled to the support bracket 511.

The driven member 524 is sleeved to the shaft portion 5212 of the rotatable member 521. The fixing pin 523 is inserted into the pin hole 5244 of driven member 524 and the pinhole 5213 of the shaft portion 5212 of the rotatable member 521, thus the driven member 524 is fixed to the shaft portion 5212 of the rotatable member 521. In order to prevent the sliding module from detaching off the rotatable member 521, the fixing sheet 512 is fixed to the mounting pieces 5114 of the support bracket 511 by using screws received in the fixing holes 5121 of the fixing sheet 512 and the mounting holes 5118 of the support bracket 511 correspondingly. The spring base 513 is fixed to the fixing sheet 512 by using screws received in the mounting holes 5131 of the spring base 513 and the positioning holes 5122 of the fixing sheet 512. The coil spring 514 is positioned in the curved groove of the spring base 513 with an end of the coil spring 514 fixed to the fixing piece 5265 of the sliding bracket 526. The coil spring 514 is restricted in the spring base 513 by a top cover (not shown). Thus, the support mechanism 51 is assembled.

After assembled the elevating mechanism 52 and the support mechanism 51, the rotatable member 521, the positioning module 522, and driven member 524 cannot rotate relative to each other. The support bracket 511, the sliding bracket 526, the sliding member 527, and the fixing bracket 528 cannot rotate relative to each other.

The end adjacent to the flange 5342 of the pivot shaft 534 is inserted into the first strengthening member 533. The first strengthening member 533 is received in one of the latching members 532. Another end of the pivot shaft 534 opposite to the flange 5342 is passed through the pivot hole 5313 of one fixing wall 5312 of the support bracket 531, the through hole 5351 of the driver 535, the pivot hole 5313 of another fixing wall 5312 of the support bracket 531, the non-circular hole 5361 of the washer 536, the non-circular hole 5371 of the second strengthening member 537, another one of the latching members 532 in that order, and then inserted into the middle hole 5381 of the operation wheel 538. The latching members 532 are latched to the fixing walls 5312 of the support bracket 531 correspondingly. After assembled, the driver 535 is restricted in the receiving groove 5311 of the support bracket 531. The second strengthening member 537 is also received in one of the latching members 532. Thus, the first strengthening members 533, the pivot shaft 534, the driver 535, the washer 536, the second strengthening member 537, and the operation wheel 538 cannot rotate relative to each other, but can rotate relative to the support bracket 531, and the latching members 532.

Referring to FIG. 7 again, the support mechanism 51, the elevating mechanism 52, and the adjusting mechanism 53 are assembled to form the elevator 50. The support bracket 511 is fixed on the support bracket 531, and the driver 535 meshes with the driven member 524. A diameter of the driver 535 is preferably larger than that of the driven member 524, thus the transmission gear ratio is less than one.

Figure 7:
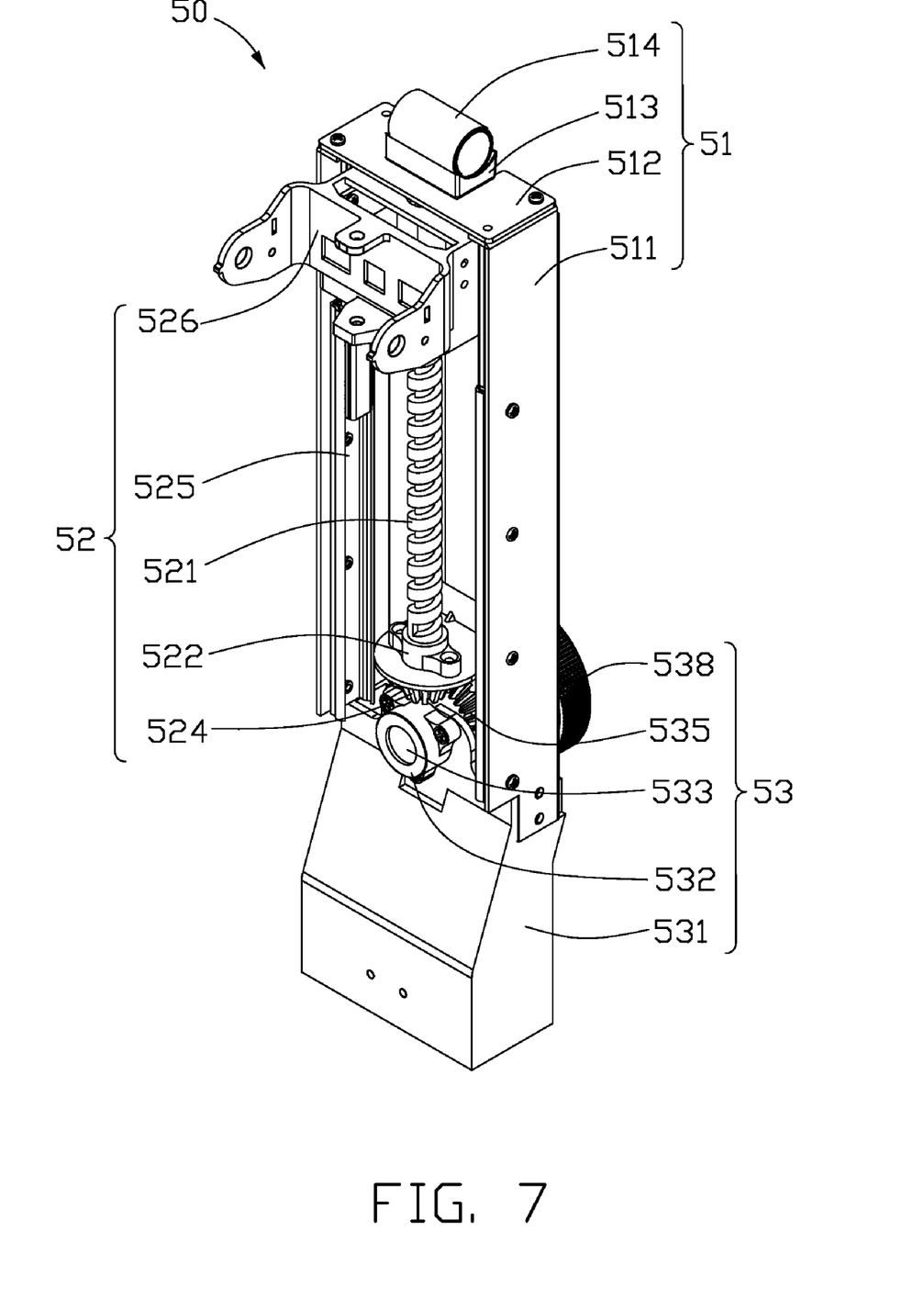
FIG. 7 is an assembled, isometric view of an elevating mechanism of the elevator of FIG. 2.

When the support stand 40 is used for supporting the flat display monitor, the flat display monitor is fixed to the sliding bracket 526. To adjust an altitude of the flat display monitor relative to the base member 42, the operation wheel 538 is rotated together with an external force, consequently also rotating the driver 535, thus the driven member 524 is driven to rotate with the rotatable member 521 by the driver 535. When the rotatable member 521 is rotated, the sliding member 527 slides upwards or downwards along the threaded portion 5211 of the rotatable member 521, thereby driving sliding bracket 526 and the fixing bracket 528 to move upwards or downwards. Because the flat display monitor is fixed to the sliding bracket 526, thus the flat display monitor moves together with the sliding bracket 526 to adjust the altitude of the flat display monitor relative to a user. When the external force is released, the flat display monitor with the sliding bracket 526 remains in a predetermined position by an elastic force of the coil spring 514 and a friction force created by the support mechanism 51, the elevating mechanism 52, and the adjusting mechanism 53.

In the present invention, the altitude of the flat display monitor the base member 42 is convenient to be adjusted by rotating the operation wheel 538 of the support stand 50. In addition, because the diameter of the driver 535 is larger than that of the driven member 524, when the driver 535 rotates one full circle, the driven member 524 can be driven to rotate a plurality of full circles. Therefore, the sliding bracket 526 is able to quickly slide upwards or downwards, that is, the altitude of the flat display monitor relative to the base member 42 can be adjusted quickly.

It should be pointed out that, the rotatable member 521 and the sliding member 527 may be replaced by other structures which can convert rotation to linear motion, for example, a structure including worm and worm wheel. In addition, the driver 535 and the driven member 524 may other gearings such as two standard gears, and one standard gear as the driver 535 has a lager diameter than the other one.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A support stand for a flat display monitor, comprising:
    a monitor bracket capable of connecting to the flat display monitor;
    a base member; and
    an elevator mounted to the base member and adjustably connected to the monitor bracket, the elevator comprising:
        a support mechanism having a support bracket and a coil spring;
        an elevating mechanism comprising:
            a rotatable member rotatably attached to the support bracket;
            a driven member fixed to the rotatable member;
            a sliding bracket fixed to the monitor bracket and slidably connected to the support bracket; and
            a sliding member fixed to the sliding bracket, the sliding member being capable of engaging with the rotatable member for converting rotation to linear motion; and
        an adjusting mechanism fixed on the base member, the adjusting mechanism having a driver capable of engaging with the driven member and driving the driven member to rotate, a bottom end of the support bracket being fixed to the adjusting mechanism, an end of the coil spring being fixed on the sliding bracket, and another end of the coil spring being connected to the support bracket.

2. The support stand as claimed in claim 1, wherein the rotatable member is a screw shaft including a threaded portion, the sliding member is a nut engaged with the threaded portion, the driver and the driven member are both bevel gears, a gear portion of the driver engages with a gear portion of the driven member for driving the driven member to rotate, and the driven member is fixed to an end of the rotatable member.

3. The support stand as claimed in claim 2, wherein a diameter of the driver is larger than that of the driven member, and the transmission gear ratio is less than one.

4. The support stand as claimed in claim 2, wherein the support mechanism further comprises a fixing sheet fixed on a top end of the support bracket, and a spring base mounted on the fixing sheet for receiving the coil spring.

5. The support stand as claimed in claim 4, wherein the fixing sheet is a rectangular sheet, and the spring base defines a curved groove for mounting the coil spring.

6. The support stand as claimed in claim 4, wherein the support bracket comprises a main portion, two side portions, a support piece, and two mounting pieces; the side portions perpendicularly extend from opposite sides of the main portion, and each of the side portions defines a plurality of through holes for connecting the support bracket to the elevating mechanism; the support piece perpendicularly extends from an end of the main portion and defines a through hole in a middle; the rotatable member rotatably extends through the through hole; and the mounting pieces extend inwards from an end of the side portions correspondingly for mounting the fixing sheet.

7. The support stand as claimed in claim 6, wherein the elevating mechanism further comprises a positioning module, a fixing pin, a pair of guide rails, and a fixing bracket; the sliding bracket, the sliding member, and the fixing bracket cooperatively form a sliding module, and the sliding module is slidable along the threaded portion of the rotatable member; and each of the guide rails includes an exterior rail fixed to one of the side portions of the support bracket and an inner rail fixed to the sliding bracket, and the inner rail is slidable relative to the exterior rail.

8. The support stand as claimed in claim 7, wherein the sliding bracket comprises two sidewalls for fixing the inner rails of the guide rails, an upper wall, and a rear wall, the sidewalls perpendicularly extend from opposite ends of the upper wall, the upper wall defines a through hole in a middle for allowing the rotatable member to pass through, the rear wall extends from a side of the upper wall and is connected to the sidewall, two extending pieces perpendicularly extend from opposite ends of the rear wall correspondingly and are configured for connecting to the flat display monitor, a fixing piece perpendicularly extends from another side of the upper wall opposite to the rear wall, and the fixing piece is configured for fixing the end of the coil spring.

9. The support stand as claimed in claim 7, wherein the adjusting mechanism further comprises a support bracket, a pivot shaft, and an operation wheel; the support bracket defines a receiving groove for receiving the driver, and further includes two fixing walls positioned on opposite sides of the receiving groove; each of the fixing walls defines a pivot hole in a middle thereof; and the pivot shaft is inserted through the pivot hole of one fixing wall, the driver, the pivot hole of the other fixing wall, and the operation wheel; and the pivot shaft is fixed relative to the driver and the operation wheel.

10. The support stand as claimed in claim 9, wherein the adjusting mechanism further comprises two latching members, a first strengthening member, a washer, and a second strengthening member defining a non-circular hole, an end of the pivot shaft is inserted into the first strengthening member, the first strengthening member is received in one of the latching members, and another end of the pivot shaft is passed through the pivot hole of one fixing wall of the support bracket, the driver, the pivot hole of the other fixing wall of the support bracket, the washer, the non-circular hole of the second strengthening member, and the other latching member in that order, and inserted into the operation wheel.

11. An elevator, used for a support stand of a flat display monitor, comprising:
    a support mechanism having a support bracket and a coil spring;
    an elevating mechanism comprising:
        a rotatable member rotatably attached to the support bracket;
        a driven member fixed to the rotatable member;
        a sliding bracket slidably connected to the support bracket; and
        a sliding member fixed to the sliding bracket, the sliding member being capable of engaging with the rotatable member for converting rotation to linear motion; and
    an adjusting mechanism, the adjusting mechanism having a driver, the driver being capable of engaging with the driven member and driving the driven member to rotate, a bottom end of the support bracket being fixed to the adjusting mechanism, an end of the coil spring being fixed on the sliding bracket, and another end of the coil spring being connected to the support bracket.

12. The elevator as claimed in claim 11, wherein the rotatable member is a screw shaft including a threaded portion, the sliding member is a nut engaged with the threaded portion, the driver and the driven member are both bevel gears, a gear portion of the driver engages with a gear portion of the driven member for driving the driven member to rotate, and the driven member is fixed to an end of the rotatable member.

13. The elevator as claimed in claim 12, wherein a diameter of the driver is larger than that of the driven member, and the transmission gear ratio is less than one.

14. The elevator as claimed in claim 12, wherein the support mechanism further comprises a fixing sheet fixed on a top end of the support bracket, and a spring base mounted on the fixing sheet for receiving the coil spring.

15. The elevator as claimed in claim 14, wherein the fixing sheet is a rectangular sheet, and the spring base defines a curved groove for mounting the coil spring.

16. The elevator as claimed in claim 14, wherein the support bracket comprises a main portion, two side portions, a support piece, and two mounting pieces; the two side portions perpendicularly extend from opposite sides of the main portion, each of the side portions defines a plurality of through holes for connecting the support bracket to the elevating mechanism; the support piece perpendicularly extends from an end of the main portion and defines a through hole in a middle, and the rotatable member rotatably extends through the through hole; and the mounting pieces extend inwards from an end of the side portions correspondingly for mounting the fixing sheet.

17. The elevator as claimed in claim 16, wherein the elevating mechanism further comprises a positioning module, a fixing pin, a pair of guide rails, and a fixing bracket; the sliding bracket, the sliding member, and the fixing bracket cooperatively form a sliding module, and the sliding module is slidable along the threaded portion of the rotatable member; and each of the guide rails includes an exterior rail fixed to one side portion of the support bracket and an inner rail fixed to the sliding bracket, and the inner rail is slidable relative to the exterior rail.

18. The elevator as claimed in claim 17, wherein the sliding bracket comprises two sidewalls for fixing the inner rails of the guide rails, an upper wall, and a rear wall, the sidewalls perpendicularly extend from opposite ends of the upper wall, the upper wall defines a through hole in a middle for allowing the rotatable member to pass through, the rear wall extends from a side of the upper wall and is connected to the sidewall, two extending pieces perpendicularly extend from opposite ends of the rear wall correspondingly and are configured for connecting to the flat display monitor, a fixing piece perpendicularly extends from another side of the upper wall opposite to the rear wall, and the fixing piece is configured for fixing the end of the coil spring.

19. The elevator as claimed in claim 17, wherein the adjusting mechanism further comprises a support bracket, a pivot shaft, and an operation wheel; the support bracket defines a receiving groove for receiving the driver, and further includes two fixing walls positioned on opposite sides of the receiving groove; each of the fixing walls defines a pivot hole in a middle thereof; and the pivot shaft is inserted through the pivot hole of one fixing wall, the driver, the pivot hole of the other fixing wall, and the operation wheel; and the pivot shaft is fixed relative to the driver and the operation wheel.

20. The elevator as claimed in claim 19, wherein the adjusting mechanism further comprises two latching members, a first strengthening member, a washer, and a second strengthening member defining a non-circular hole, an end of the pivot shaft is inserted into the first strengthening member, the first strengthening member is received in one of the latching members, and another end of the pivot shaft is passed through the pivot hole of one fixing wall of the support bracket, the driver, the pivot hole of the other fixing wall of the support bracket, the washer, the non-circular hole of the second strengthening member, and the other latching member in that order, and inserted into the operation wheel.

* * * * *